United States Patent
Tsuboi

(10) Patent No.: US 11,167,416 B2
(45) Date of Patent: Nov. 9, 2021

(54) SPEED REDUCER ANGULAR TRANSMISSION ERROR IDENTIFICATION SYSTEM AND SPEED REDUCER ANGULAR TRANSMISSION ERROR IDENTIFICATION METHOD

(71) Applicant: KAWASAKI JUKOGYO KABUSHIKI KAISHA, Kobe (JP)

(72) Inventor: Nobutaka Tsuboi, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 184 days.

(21) Appl. No.: 16/614,510

(22) PCT Filed: May 17, 2018

(86) PCT No.: PCT/JP2018/019198
§ 371 (c)(1),
(2) Date: Nov. 18, 2019

(87) PCT Pub. No.: WO2018/212307
PCT Pub. Date: Nov. 22, 2018

(65) Prior Publication Data
US 2020/0180153 A1 Jun. 11, 2020

(30) Foreign Application Priority Data
May 18, 2017 (JP) .............................. JP2017-099193

(51) Int. Cl.
*B25J 9/00* (2006.01)
*B25J 9/16* (2006.01)
*B25J 9/10* (2006.01)

(52) U.S. Cl.
CPC ............. *B25J 9/1653* (2013.01); *B25J 9/102* (2013.01); *B25J 9/1674* (2013.01)

(58) Field of Classification Search
CPC ........ B25J 9/1653; B25J 9/102; B25J 9/1674; B25J 9/1641; G05B 2219/49197;
(Continued)

(56) References Cited

U.S. PATENT DOCUMENTS

2014/0148293 A1* 5/2014 Akae ...................... B25J 9/0087
475/6

FOREIGN PATENT DOCUMENTS

| GN | 1165415 C | 9/2004 |
| GN | 101691739 A | 4/2010 |

(Continued)

*Primary Examiner* — Ian Jen
(74) *Attorney, Agent, or Firm* — Oliff PLC

(57) ABSTRACT a speed reducer angular transmission error identification system including a variation data acquisition unit that acquires first variation data indicating a periodic variation of an operation of a second joint caused by a first motor's angular transmission error when a first joint control unit rotates a first motor's output shaft in a first direction at a constant first target speed and a second joint drive unit rotates an output shaft of a second motor at a constant second target speed, second variation which is data indicating a periodic variation of an operation of second joint caused by the first motor's angular transmission error when the first joint control unit rotates the first motor's output shaft in a second direction at the constant first target speed and the second joint control unit rotates the second motor's output shaft at the constant second target speed.

13 Claims, 11 Drawing Sheets

(58) Field of Classification Search
CPC ........... G05B 2219/41122; G05B 2219/39195; G05B 2219/49292; F04B 17/03; F04B 49/06; F04B 49/20; F04B 49/02; F04B 49/022; F04B 49/065; F04B 9/02; F04B 2201/0201; F04B 2203/0209; F04B 49/12; F04B 9/047; F04D 15/0066; F04D 15/0254; B60W 10/30

See application file for complete search history.

(56) References Cited

FOREIGN PATENT DOCUMENTS

| | | |
|---|---|---|
| GN | 104583351 A | 4/2015 |
| JP | S63-153610 A | 6/1988 |
| JP | 2010-149203 A | 7/2010 |
| JP | 2015-006705 A | 1/2015 |

\* cited by examiner

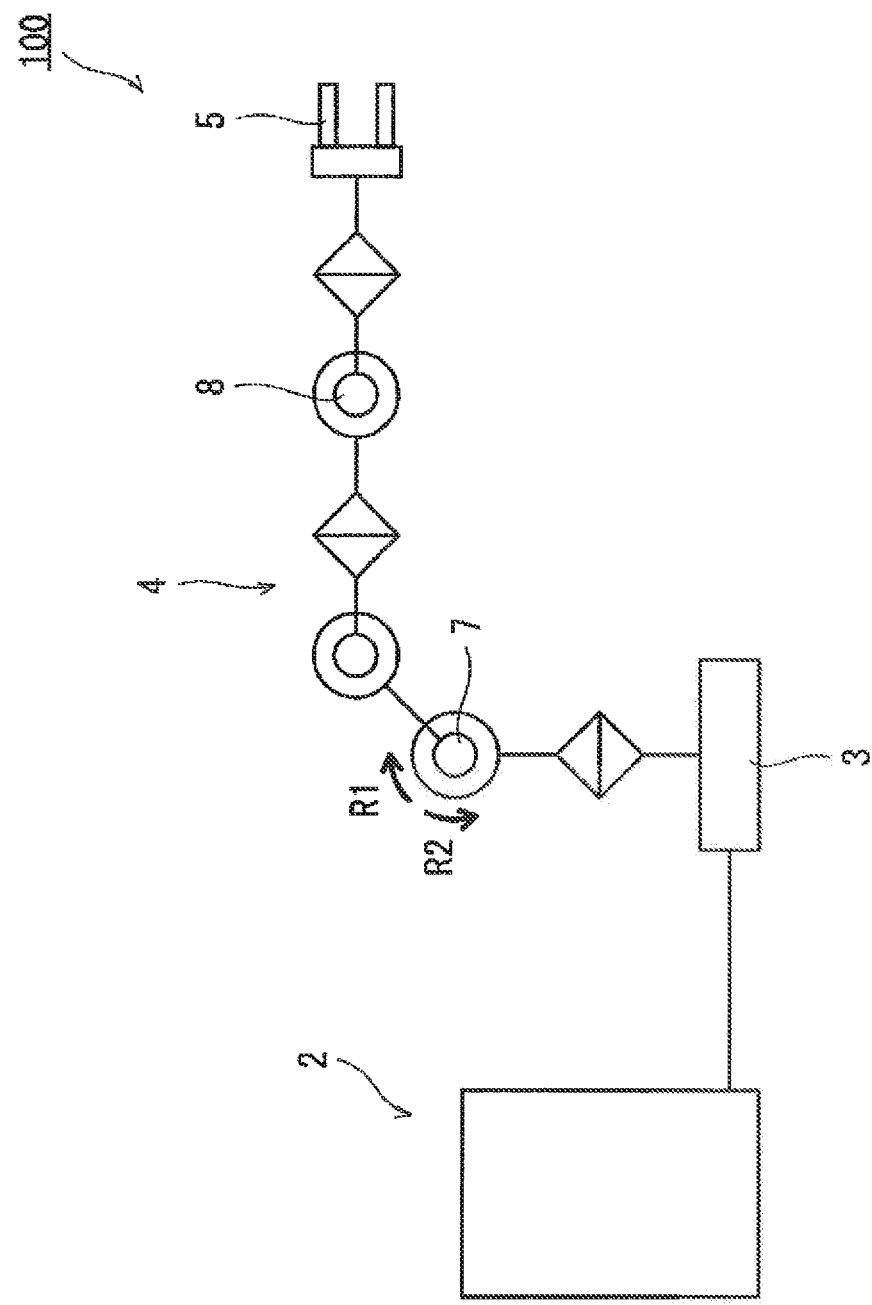
[Fig. 1]

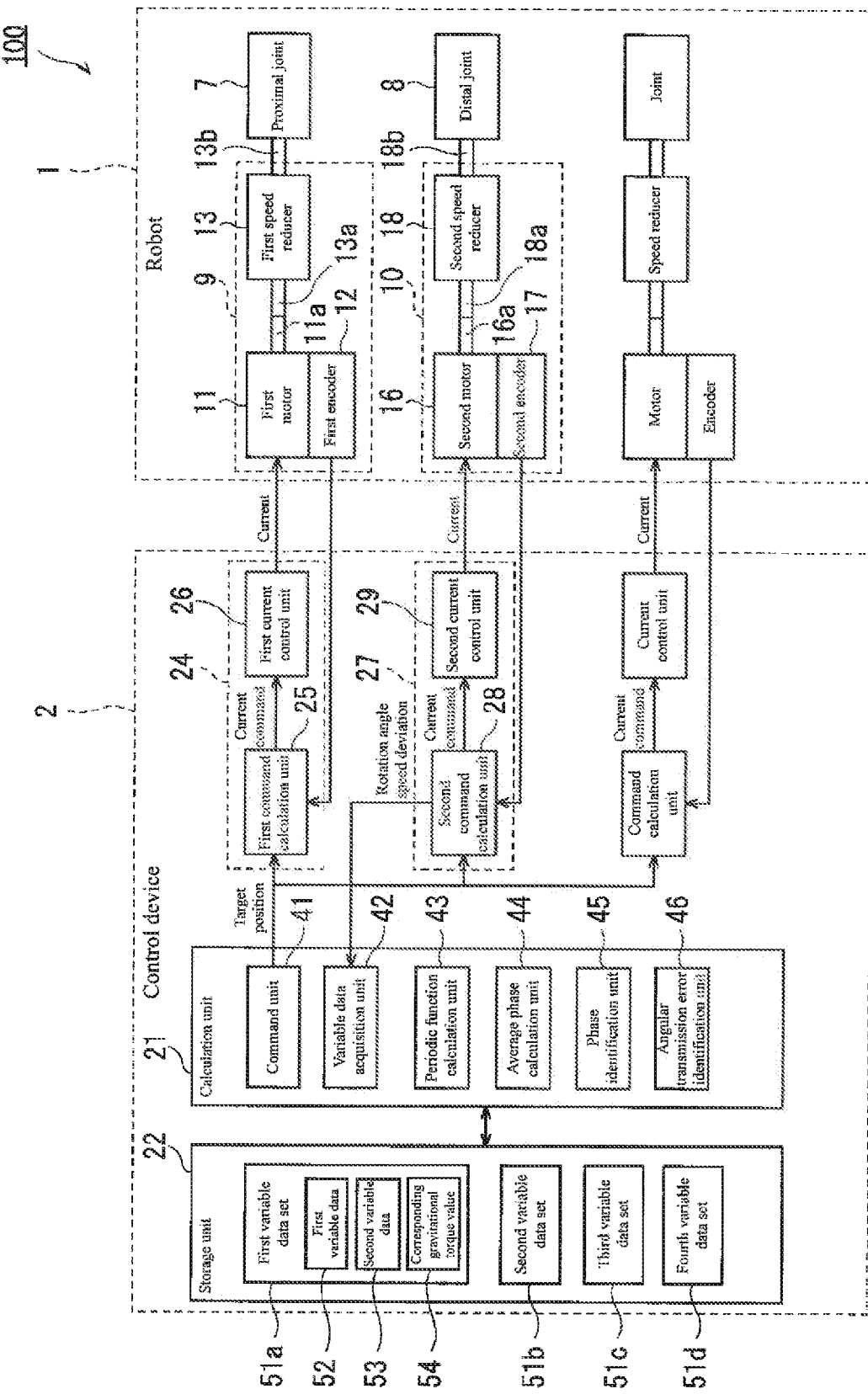
[Fig. 2]

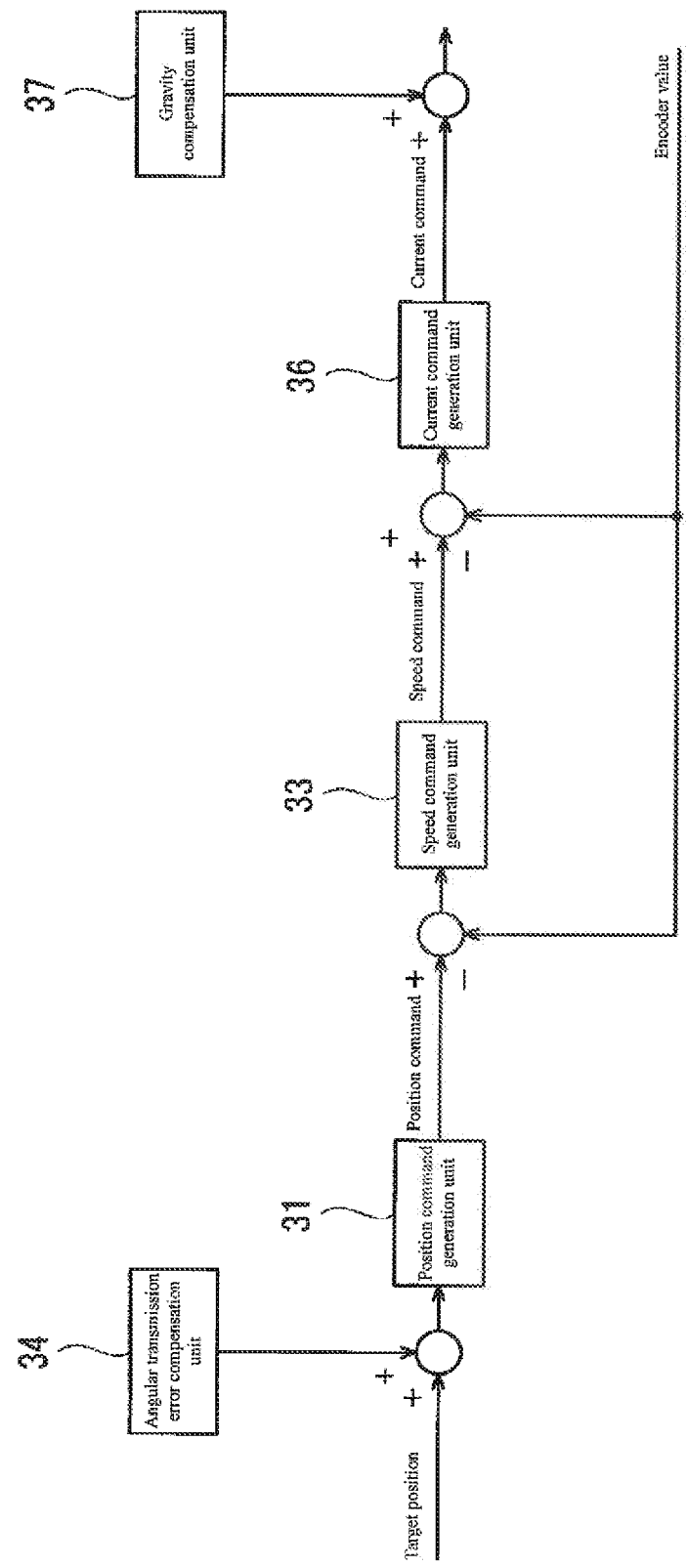
[Fig. 3]

[Fig. 4]
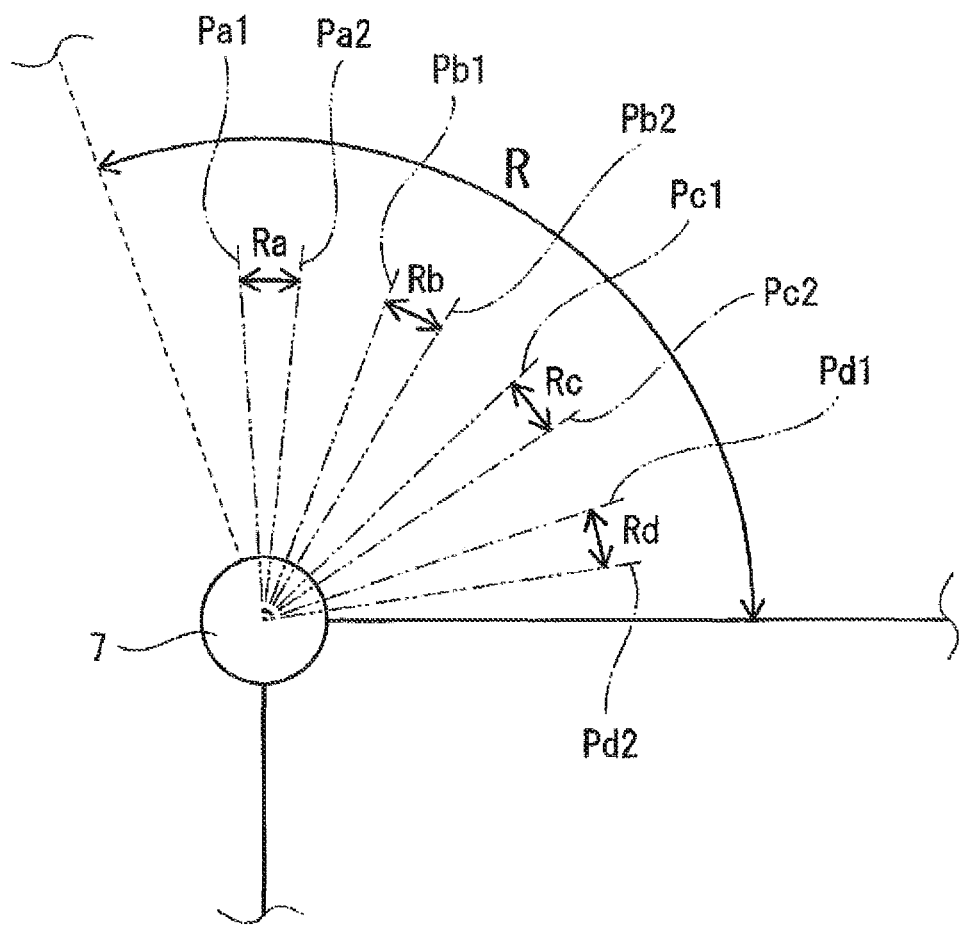

[Fig. 5]
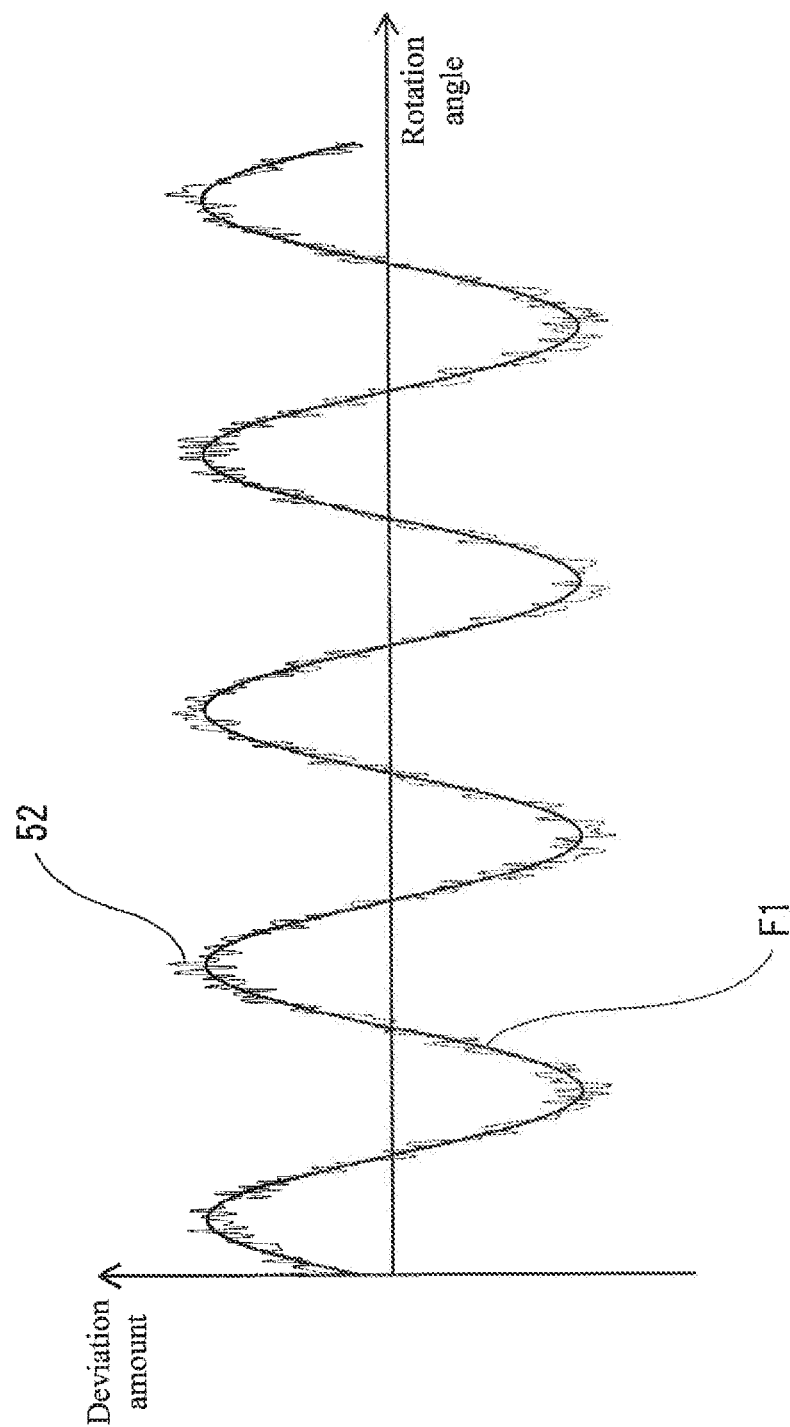

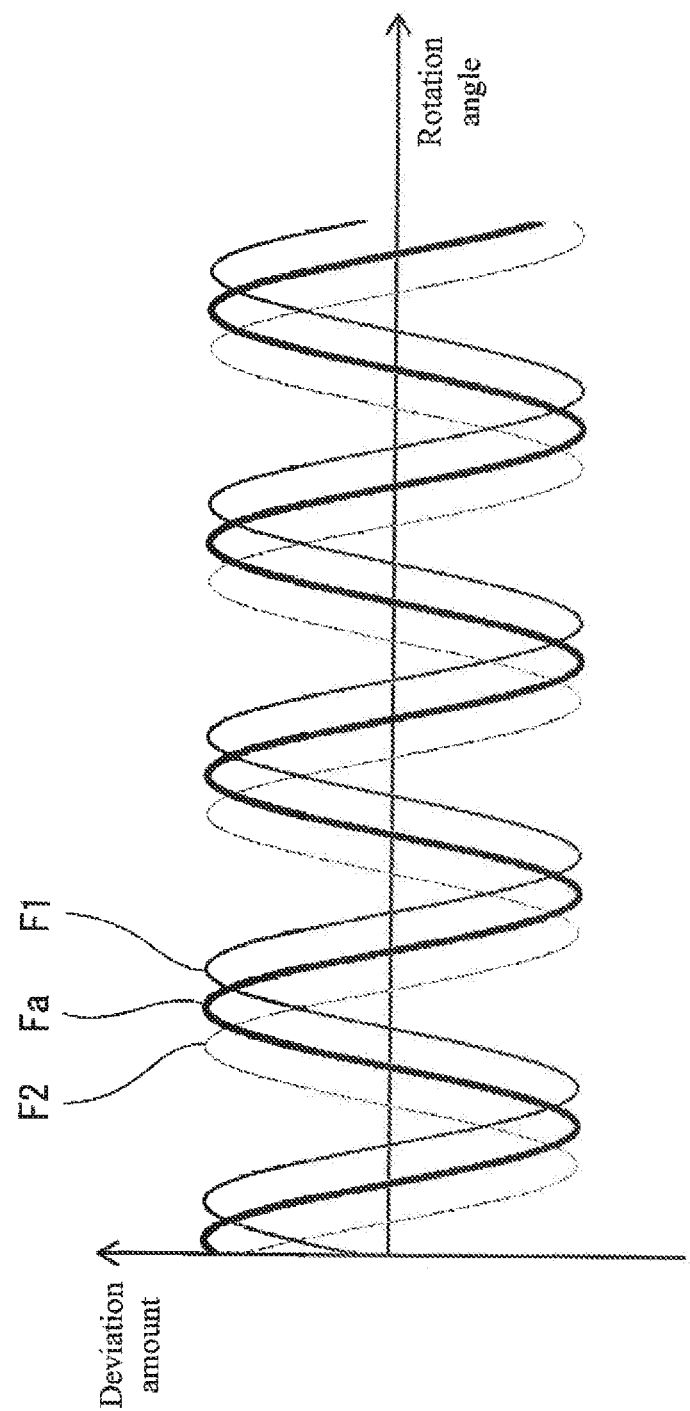
[Fig. 6]

[Fig. 7]
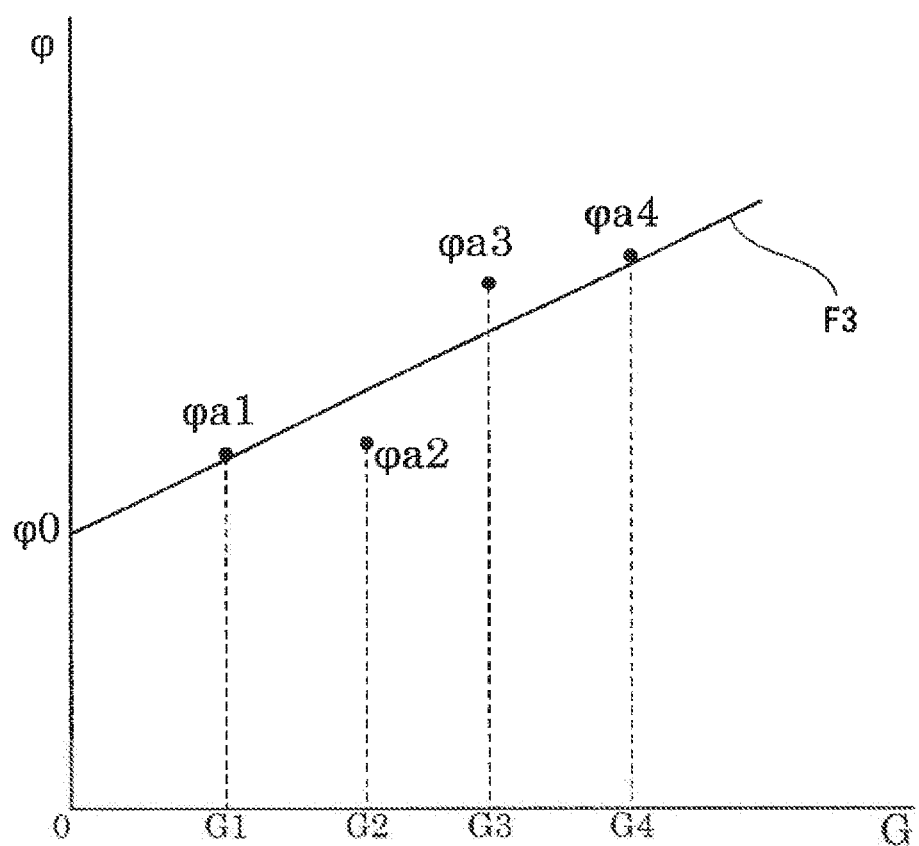

[Fig. 8]
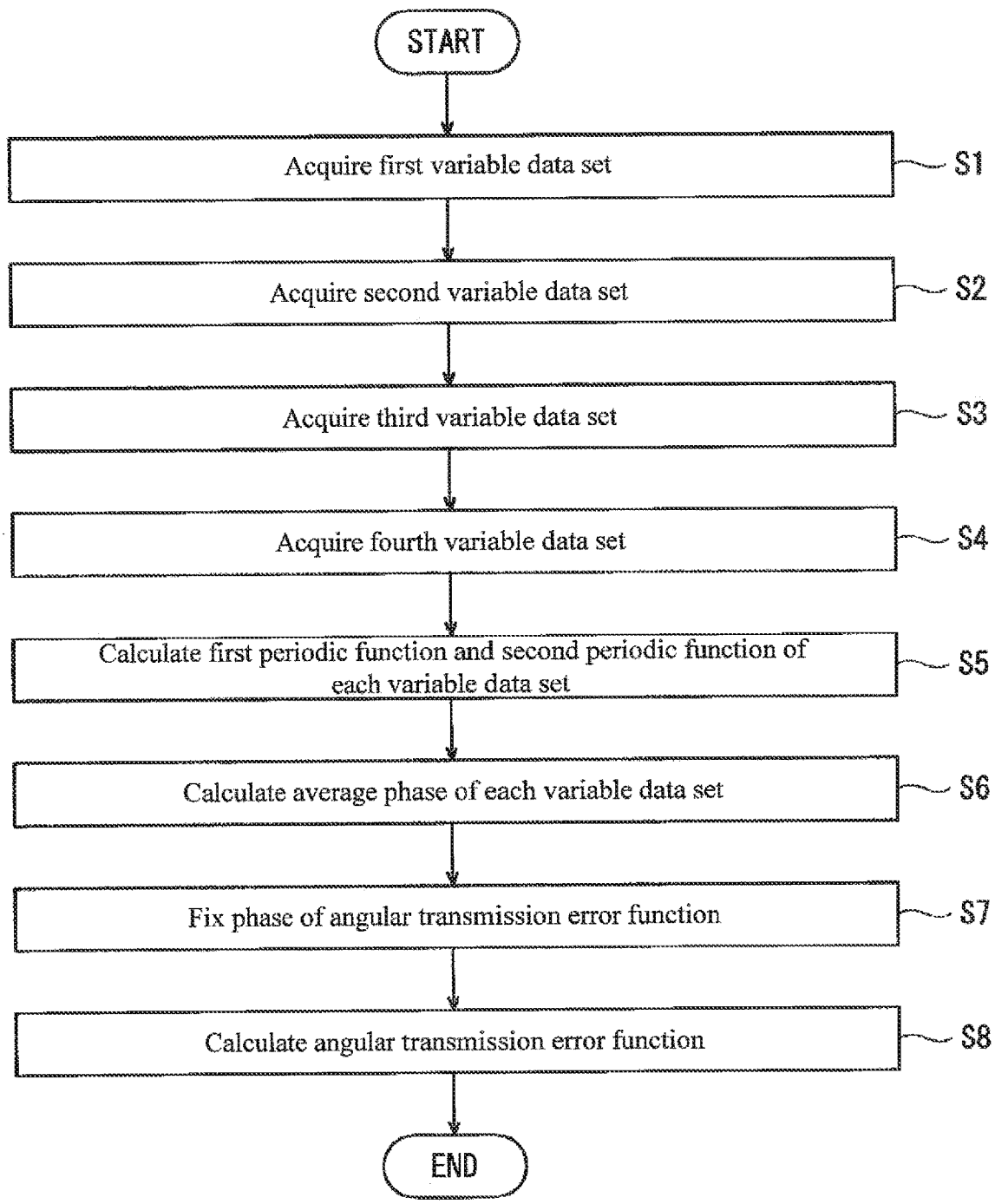

[Fig. 9]
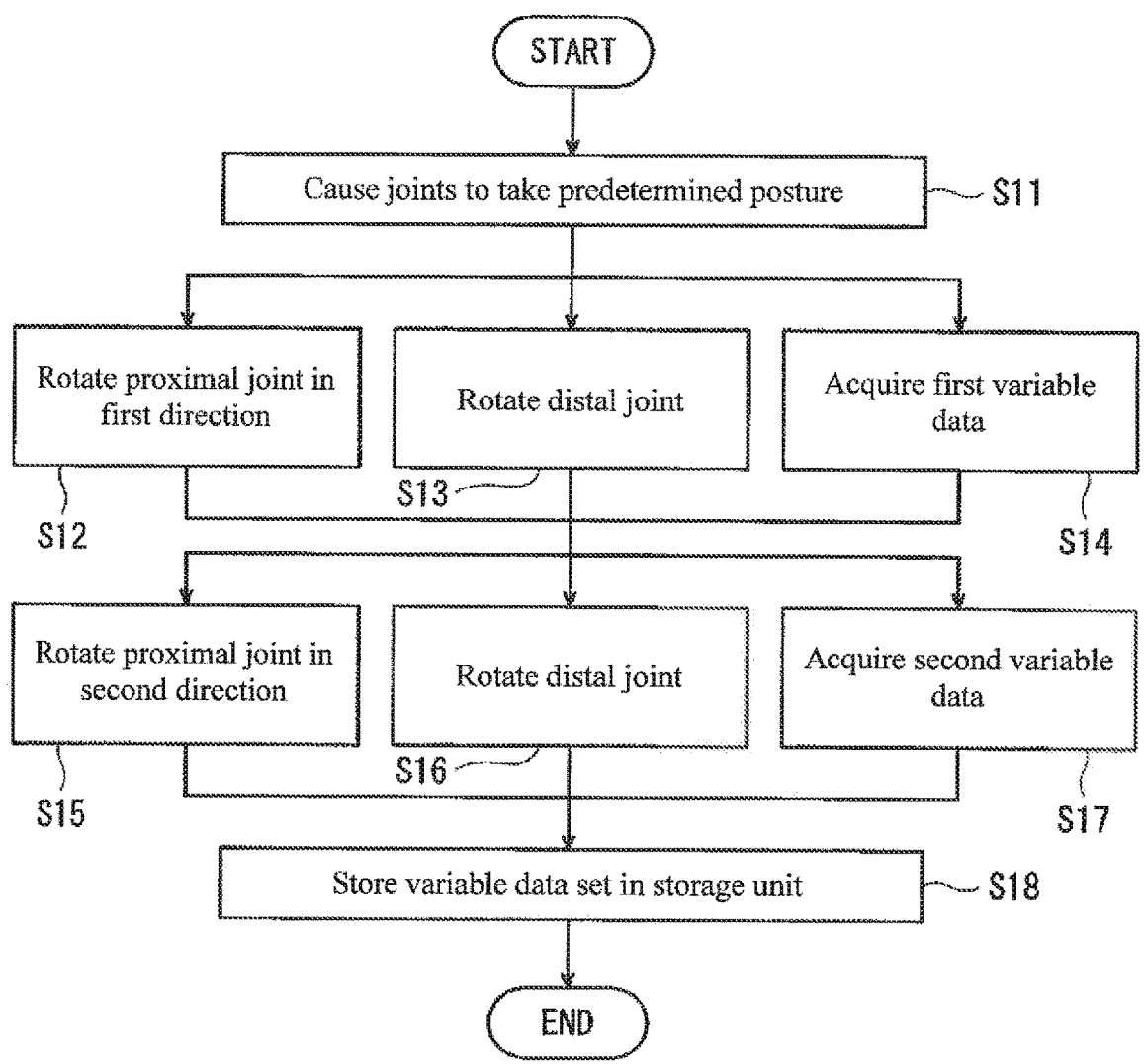

[Fig. 10]
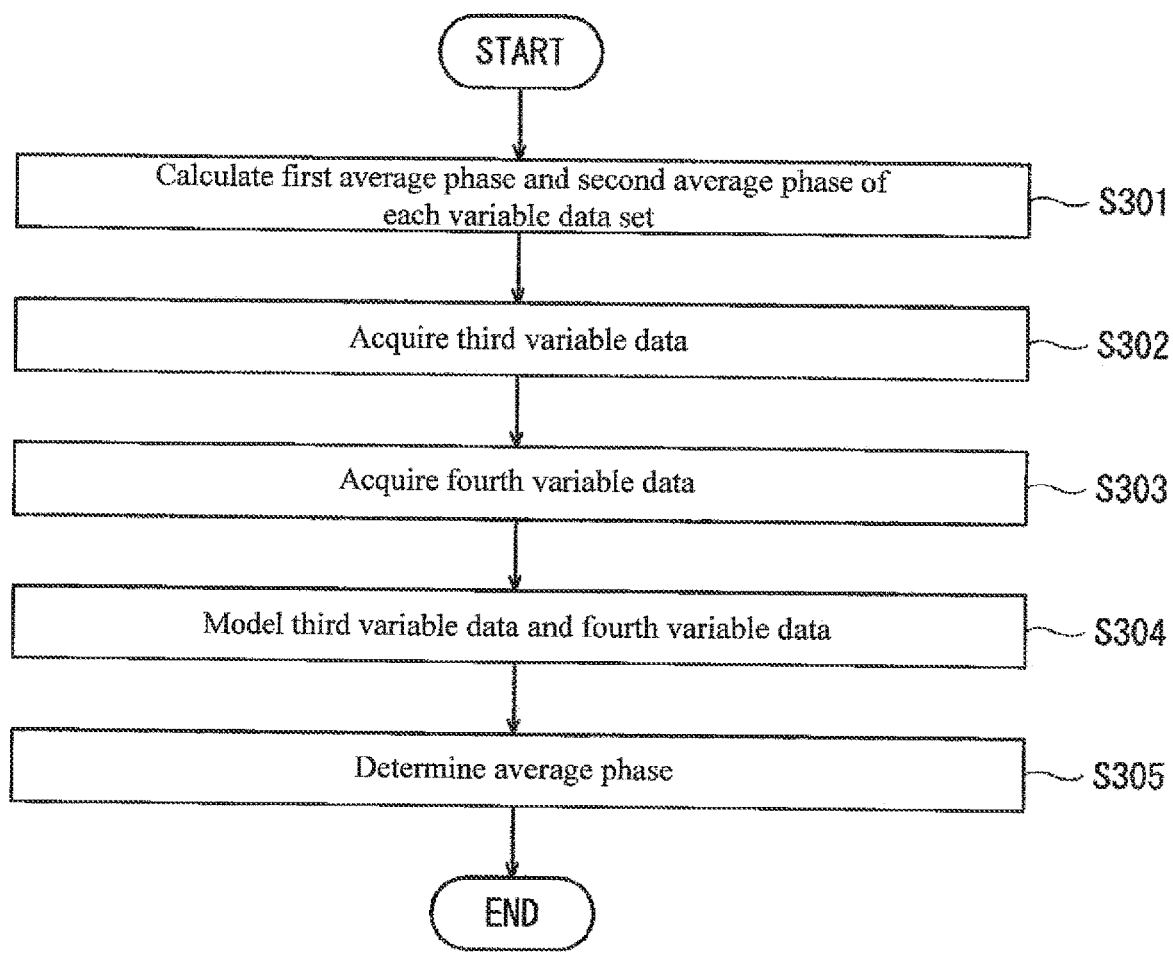

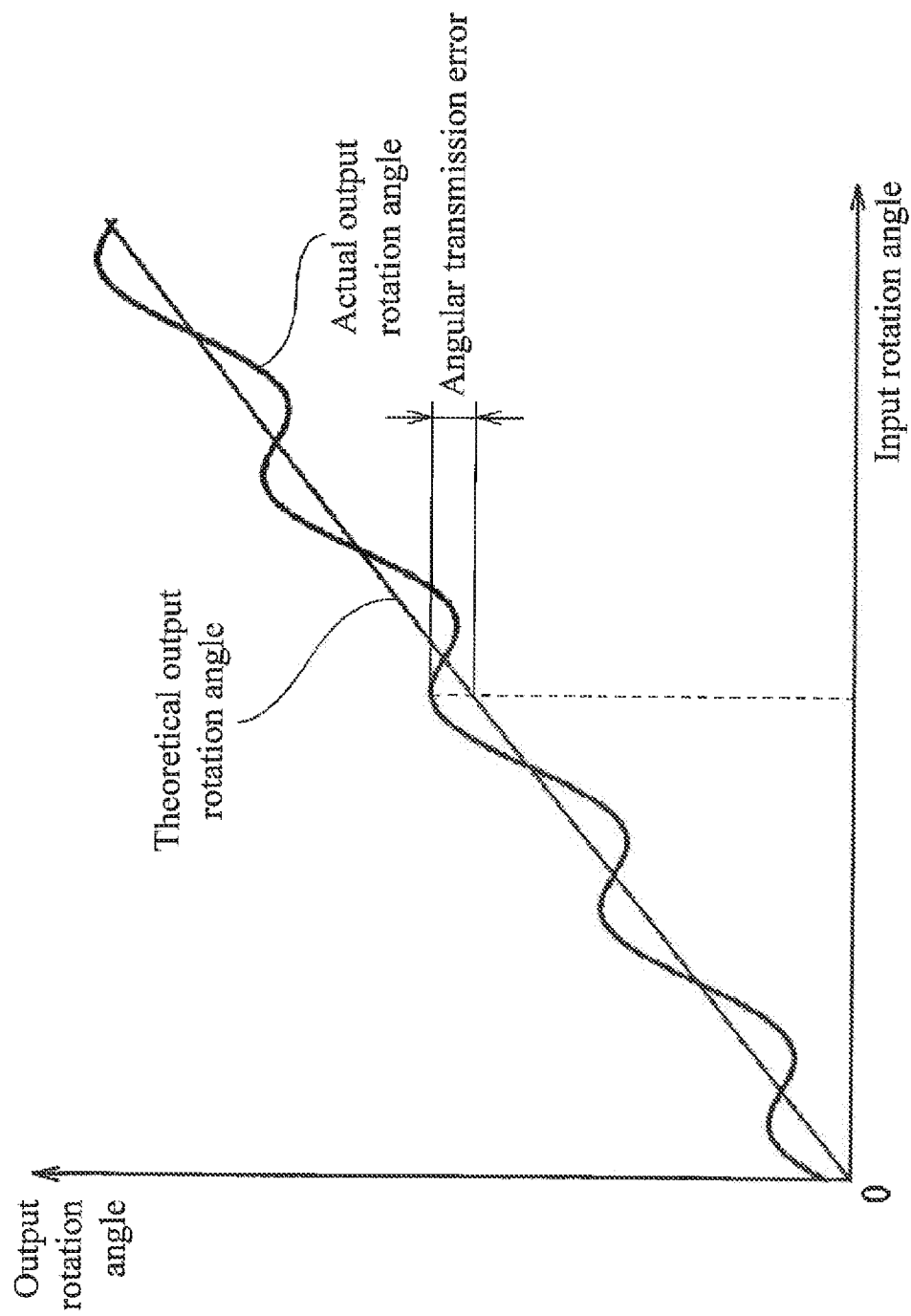
[Fig. 11]

SPEED REDUCER ANGULAR TRANSMISSION ERROR IDENTIFICATION SYSTEM AND SPEED REDUCER ANGULAR TRANSMISSION ERROR IDENTIFICATION METHOD

TECHNICAL FIELD

The present invention relates to a speed reducer angular transmission error identification system and a speed reducer angular transmission error identification method.

BACKGROUND ART

Conventionally, a robot control device has been known (see, for example, Patent Literature 1).

This robot control device includes a correction signal generation unit for outputting a collection signal for canceling out error vibration (rotation unevenness) of Harmonic Drive (registered trademark) speed reducer. This correction signal generation unit includes a phase setting device that sets the phase difference a of the correction signal, and the phase difference a can obtain a phase difference that minimizes the error vibration by actual measurement.

CITATION LIST

Patent Literature

PTL1: JPS63-153610A

SUMMARY OF INVENTION

Technical Problem

However, the robot control device described in Patent Literature 1 has a problem that it may take time to identify the phase difference because the phase difference of the correction signal is obtained by trial and error.

Solution to Problem

In order to solve the above problem, provided is a speed reducer angular transmission error identification system including: a robot arm including a plurality of joints including a first joint and a second joint; a first joint drive unit including a first speed reducer including an output shaft connected to the first joint, and a fast motor which includes an output shaft connected to an input shaft of the first speed reducer and turns the first joint via the first speed reducer; a first joint count unit that controls an operation of the first motor; a second joint drive unit including a second motor which includes an output shaft connected to the second joint and turns the second joint; a second joint control unit that controls an operation of the second motor, a variation data acquisition unit that acquires first variation data and second variation data associated with each other, the first variation data being data indicating a periodic variation of an operation of the second joint caused by an angular transmission error of the first motor when the first joint control unit controls so as to rotate the output shaft of the first motor in a first direction at a constant first target speed and to turn the first joint firm a position of one end to a position of the other end in a predetermined region in a turning range of the first joint and simultaneously the second joint drive unit rotates the output shaft of the second motor at the constant second target speed, the second variation data being data indicating a periodic variation of an operation of the second joint caused by an angular transmission error of the first motor when the first joint control unit controls so as to rotate the output shaft of the first motor in a second direction which is a rotation direction opposite to the first direction at the constant first target speed and to turn the first joint from the position of the other end to the position of the one end in the region and simultaneously the second joint drive unit rotates the output shaft of the second motor at the constant second target speed; a periodic function calculation unit that calculates a first periodic function that models the first variation data and a second periodic function that models the second variation data; a phase calculation unit that calculates an average phase that is an average value of a phase of the first periodic function and a phase of the second periodic function; and an angular transmission error identification unit that calculates a periodic variation of an angular transmission error of the first speed reducer based on the average phase.

According to this configuration, the phase of the angular transmission error can be identified accurately. As a milt, the angular transmission error can be compensated accurately, and the vibration of the robot hand can be suppressed. In addition, the phase of angular transmission error can be quickly identified.

Furthermore, it is not necessary to separately provide measurement unit for phase identification, and the system configuration can be simplified. This is advantageous for manufacture and manufacturing cost is reduced.

Advantageous Effects of Invention

The present invention has an effect that the angular transmission error can be compensated accurately and the vibration of the robot hand can be suppressed.

BRIEF DESCRIPTION OF DRAWINGS

FIG. 1 is a diagram schematically showing a configuration example of a robot system including a speed reducer angular transmission error identification system according to the first embodiment.

FIG. 2 is a block diagram schematically showing a configuration example of a control system of the robot system in FIG. 1.

FIG. 3 is a block diagram schematically showing a configuration example of a control system of a first command calculation unit and a second command calculation unit of the robot system in FIG. 1.

FIG. 4 is an explanatory diagram illustrating an example of first to fourth regions of a turning range of a proximal joint of a robot of the robot system.

FIG. 5 is a graph showing an example of first variation data of the robot system in FIG. 1.

FIG. 6 is a graph showing a first periodic function and a second periodic function calculated by a periodic function calculation unit of the robot system in FIG. 1.

FIG. 7 is a graph showing an example of a correlation between a phase of an angular transmission error and a phase of gravitational torque of the robot system in FIG. 1.

FIG. 8 is a flowchart showing an operation example of the robot system in FIG. 1.

FIG. 9 is a flowchart showing an operation example of the robot system in FIG. 1.

FIG. 10 is a flowchart showing an operation example of a robot system according to the third embodiment.

FIG. 11 is an explanatory diagram of an angular transmission error.

DESCRIPTION OF EMBODIMENTS

According to one mode, there is provided a speed reducer angular transmission error identification system including: a robot arm including a plurality of joints including a first joint and a second joint; a first joint drive unit including a first speed reducer including an output shaft connected to the first joint, and a first motor which includes an output shaft connected to an input shaft of the first speed reducer and turns the first joint via the first speed reducer; a first joint control unit that controls an operation of the first motor; a second joint drive unit including a second motor which includes an output shaft connected to the second joint and turns the second joint; a second joint control unit that controls an operation of file second motor, a variation data acquisition unit that acquires first variation data and second variation data associated with each other, the first variation data being data indicating a periodic variation of an operation of the second joint caused by an angular transmission error of the first motor when the first joint control unit controls so as to rotate the output shaft of the first motor in a first direction at a constant first target speed and to turn the first joint form a position of one end to a position of the other end in a predetermined region in a turning range of the first joint and simultaneously the second joint drive unit rotates the output shaft of the second motor at the constant second target speed, the second variation data being data indicating a periodic variation of an operation of the second joint caused by an angular transmission error of the first motor when the first joint control unit controls so as to rotate the output shaft of the first motor in a second direction which is a rotation direction opposite to the first direction at the constant first target speed and to turn the first joint from the position of the other end to the position of the one end in the region and simultaneously the second joint drive unit rotates the output shaft of the second motor at the constant second target speed; a periodic function calculation unit that calculates a first periodic function that models the first variation data and a second periodic function that models the second variation data; a phase calculation unit that calculates an average phase which is an average value of a phase of the first periodic function and a phase of the second periodic function; and an angular transmission error identification unit that calculates a periodic variation of an angular transmission error of the first speed reducer based on the average phase.

According to this configuration, the phase of the angular transmission error can be identified accurately. As a result, the angular transmission error can be compensated accurately, and the vibration of the robot hand can be suppressed. In addition, the phase of the angular transmission error can be quickly identified.

Furthermore, it is not necessary to separately provide measurement unit for phase identification, and the system configuration can be simplified. This is advantageous for manufacture and manufacturing cost is reduced.

The second joint drive unit may further include a second motor output shall information detection unit that detects information for detecting a rotation speed of the output shaft of the second motor, the second joint control unit may generate a command value based on a speed deviation between a target speed of the output shall of the second motor and a rotation speed of the output shaft of the second motor so that the rotation speed of the second motor maintains the target speed and control the operation of the second motor based on this command value, and the data indicating the periodic variation of the operation of the second joint caused by the angular transmission error of the first motor may be data indicating a relationship between a rotation angle of the output shall of the first motor and the speed deviation or the command value of the second motor.

According to this configuration, the phase of the angular transmission error can be identified appropriately.

The angular transmission error identification unit may calculate a periodic function that models a periodic variation of the angular transmission error of the first speed reducer, and set a phase of the periodic function based on the average phase calculated by the phase calculation unit.

According to tins configuration, the phase of the angular transmission error can be identified appropriately.

The first speed reducer may be a wave speed reduction device.

According to this configuration, the phase of the angular transmission error of the wave speed reduction device can be identified appropriately.

A tuning speed of the output shaft of the second motor is slower than a turning speed of the output shaft of the first motor when the first variation data and the second variation data are acquired.

According to this configuration, tire phase of the angular transmission error can be identified more accurately.

According to another mode, there is provided a speed reducer angular transmission error identification system including: a robot arm including a plurality of joints including a first joint and a second joint; a first joint drive unit including a first speed reducer including an output shaft connected to the first joint, and a first motor which includes an output shaft connected to an input shaft of the first speed reducer and turns the first joint via the first speed reducer; a first joint control unit that controls an operation of the first motor; a second joint drive unit including a second motor which includes an output shall connected to the second joint and turns the second joint; a second joint control unit that controls an operation of the second motor; a variation data acquisition unit that acquires a plurality of variable data sets each including first variation data, second variation data, and a corresponding gravitational torque value in which the first variation data, the second variation data, and the corresponding gravitational torque value are associated with each other, the plurality of variable data sets being data sets corresponding to different predetermined regions of a turning range of the first joint, the first variation data being data indicating a periodic variation of an operation of the second joint caused by an angular transmission error of the first motor when the first joint control unit controls so as to rotate the output shaft of the first motor in a first direction at a constant first target speed and to turn the first joint from a position of one end to a position of the other end in the corresponding region and simultaneously the second joint drive unit rotates the output shaft of the second motor at the constant second target speed the second variation data being data indicating a periodic variation of an operation of the second joint caused by an angular transmission error of the first motor when the first joint control unit controls so as to rotate the output shaft of the first motor in a second direction which is a rotation direction opposite to the first direction at the constant first target speed and to turn the first joint from the position of the other aid to the position of the one end in the corresponding region and simultaneously the second joint drive unit rotates the output shaft of the second motor at the constant second target speed the corresponding gravitational torque value being a value of gravitational torque acting on the output shaft of the first speed reducer in the corresponding region; a periodic function calculation unit that calculates a first periodic function that models the first variation data and a second periodic function that models the second variation data for each of the plurality of variable data sets; a phase calculation unit that calculates an average phase which is an average value of a phase of the first periodic function and a phase of the second periodic function for each of the plurality of variable data sets; a phase identification unit that calculates a correlation between the gravitational torque value acting on the output shaft of the first speed reducer and the average phase based on the average phase of each of the plurality of variable data sets and the corresponding gravitational torque value corresponding to the each average phase; and an angular transmission error identification unit that calculates a periodic variation of an angular transmission error of the first speed reducer based on the correlation between the gravitational torque value acting on the output shall of the first speed reducer and the average phase, which is calculated by the phase identification unit.

According to this configuration, the phase of the angular transmission error can be identified accurately. As a result, the angular transmission error can be compensated accurately, and the vibration of the robot hand can be suppressed. In addition, the phase of the angular transmission error can be quickly identified.

Furthermore, it is not necessary to separately provide measurement unit for phase identification, aid the system configuration can be simplified. This is advantageous for manufacture and manufacturing cost is reduced.

The second joint drive unit may further include a second motor output shaft information detection unit that detects information for detecting a rotation speed of the output shaft of the second motor, the second joint control unit may generate a command value based on a speed deviation between a target speed of the output shaft of the second motor and a rotation speed of the output shaft of the second motor so that the rotation speed of the second motor maintains the target speed, and control the operation of the second motor based on this command value, and the data indicating the periodic variation of the operation of the second joint caused by the angular transmission error of the first motor may be data indicating a relationship between a rotation angle of the output shaft of the first motor and the speed deviation or the command value of the second motor.

According to this configuration, the phase of the angular transmission error can be identified appropriately.

The phase identification unit may calculate a function that models the correlation between the gravitational torque value acting on the output shaft of the first speed reducer and the average phase, and the angular transmission error identification unit may calculate a periodic function that models the periodic variation of the angular transmission error of the first speed reducer, and regard a phase of the periodic function as a function calculated by the phase identification unit.

According to this configuration, the phase of the angular transmission error can be identified appropriately.

The phase identification unit may calculate the correlation between the gravitational torque value acting on the output shaft of the first speed reducer and the average phase as a linear function using a least square method.

According to this configuration, the phase of the angular transmission error can be identified appropriately.

The first speed reducer may be a wave speed reduction device.

According to this configuration, the phase of the angular transmission error of the wave speed reduction device can be identified appropriately.

A turning speed of the output shaft of the second motor is slower than a turning speed of the output shaft of the first motor when the first variation data and the second variation data are acquired.

According to this configuration, the phase of the angular transmission error can be identified more accurately.

According to one mode, there is provided a speed reducer angular transmission error identification method for a robot system, the robot system including: a robot arm including a plurality of joints including a first joint and a second joint a first joint drive unit including a first speed reducer including an output shall connected to the first joint, and a first motor which includes an output shaft connected to an input shaft of the first speed reducer and turns the first joint via the first speed reducer; a first join control unit that controls an operation of the first motor; a second joint drive unit including a second motor which includes an output shall connected to the second joint and turns tire second joint; a second joint control unit that controls an operation of the second motor; the speed reducer angular transmission error identification method including: a variation data acquisition step of acquiring first variation data and second variation data associated with each other, the first variation data being data indicating a periodic variation of an operation of the second joint caused by an angular transmission error of the first motor when the first joint control unit controls so as to rotate the output shaft of the first motor in a first direction at a constant first target speed and to turn the first joint from a position of one end to a position of the other end in a predetermined region in a turning range of the first joint and simultaneously the second joint drive unit rotates the output shaft of the second motor at the constant second target speed, the second variation data being data indicating a periodic variation of an operation of the second joint caused by an angular transmission error of the first motor when the first joint control unit controls so as to rotate the output shaft of the first motor in a second direction which is a rotation direction opposite to the first direction at the constant first target speed and to turn the first joint from the position of the other end to the position of the one end in the region and simultaneously the second joint drive unit rotates the output shaft of the second motor at the constant second target speed; a periodic function calculation step of calculating a first periodic function that models the first variation data and a second periodic function that models the second variation data; a phase calculation step of calculating an average phase which is an average value of a phase of the lira periodic function and a phase of the second periodic function; and an angular transmission error identification step calculating a periodic variation of an angular transmission error of the first speed reducer based on the average phase.

According to this configuration, the phase of the angular transmission error can be identified accurately. As a result, the angular transmission error can be compensated accurately, and the vibration of the robot hand can be suppressed. In addition, the phase of the angular transmission error can be quickly identified.

Furthermore, it is not necessary to separately provide measurement unit for phase identification, anti the system configuration can be simplified. This is advantageous for manufacture and manufacturing cost is reduced.

According to another mode, there is provided a speed reducer angular transmission error identification method for a robot system, the robot system including: a robot arm including a plurality of joints including a first joint and a second joint; a first joint drive unit including a first speed reducer including an output shaft connected to the first joint, and a first motor which includes an output shaft connected to an input shaft of the first speed reducer and turns the first joint via the first speed reducer; a first joint control unit that controls an operation of the first motor; a second joint drive unit including a second motor which includes an output shaft connected to the second joint and turns the second joint; a second joint control unit that controls an operation of the second motor; the speed reducer angular transmission error identification method including: a variation data acquisition step of acquiring a plurality of variable data sets each including first variation data, second variation data, and a corresponding gravitational torque value in which the first variation data, the second variation data, and the corresponding gravitational torque value are associated with each other, the plurality of variable data sets being data sets corresponding to different predetermined regions of a turning range of the first joint, the first variation data being data indicating a periodic variation of an operation of the second joint caused by an angular transmission error of the first motor when the first joint control unit controls so as to rotate the output shaft of the first motor in a first direction at a constant first target speed and to turn the first joint from a position of one end to a position of the other end in the corresponding legion and simultaneously the second joint drive unit rotates the output shall of the second motor at constant second target speed, the second variation data being data indicating a periodic variation of an operation of the second joint caused by an angular transmission error of the first motor when the first joint control unit controls so as to rotate the output shaft of the first motor in a second direction which is a rotation direction opposite to the first direction at the constant first target speed and to turn the first joint from the position of the other end to the position of the one end in the corresponding region and simultaneously the second joint drive unit rotates the output shaft of the second motor at the constant second target speed, the corresponding gravitational torque value being a value of gravitational torque acting on the output shaft of the first speed reducer in the corresponding region; a periodic function calculation step of calculating a first periodic function that models the first variation data and a second periodic function that models the second variation data for each of the plurality of variable data sets; a phase calculation step of calculating an average phase which is an average value of a phase of the first periodic function and a phase of the second periodic function for each of the plurality of variable data sets; a phase identification step of calculating a correlation between the gravitational torque value acting on the output shaft of the first speed reducer and the average phase based on the average phase of each of the plurality of variable data sets and the corresponding gravitational torque value corresponding to the each average phase; and an angular transmission error identification step of calculating a periodic variation of an angular transmission error of the first speed reducer based on the correlation between the gravitational torque value acting on the output shall of the first speed reducer and the average phase, which is calculated by the phase identification unit.

According to this configuration, the phase of the angular transmission error can be identified accurately. As a result, the angular transmission error can be compensated accurately, and the vibration of the robot hand can be suppressed. In addition, the phase of the angular transmission error can be quickly identified.

Furthermore, it is not necessary to separately provide measurement unit for phase identification, and the system configuration can be simplified. This is advantageous for manufacture and manufacturing cost is reduced.

Hereinafter, embodiments will be described with reference to the drawings. Note that the present invention is not limited to the present embodiment. Note that, in the followings, the same or corresponding elements are denoted by the same reference symbols throughout all the drawings, and redundant description thereof is omitted.

First Embodiment

FIG. 1 is a diagram schematically showing a configuration example of a robot system 100 including a speed reducer angular transmission error identification system according to the first embodiment. FIG. 2 is a block diagram schematically showing a configuration example of a control system of the robot system 100 in FIG. 1.

As shown in FIG. 2, the robot system 100 including the speed reducer angular transmission error identification system includes a robot 1 and a control device 2.

Configuration Example of Robot

The robot 1 is an industrial robot which is an articulated robot (multi-joint robot).

The robot 1 includes a base 3, a robot arm 4, and a hand 5. For example, the base 3 is fixed and placed on a floor, and supports the robot arm 4 and the hand 5.

The robot arm 4 includes a plurality of joints, and a proximal end is turnably connected to the base 3. As for the joints of the robot atm 4, a plurality of joints are arranged in a line from the proximal end toward the distal end. The joint that identifies the angular transmission error in the speed reducer angular transmission error identification system constitutes a proximal joint (first joint) 7, and is one joint selected from the joints that are located on the proximal side of the robot arm 4 with respect to a distal joint 8. Further, the distal joint (second joint) 8 is a joint used for generating a signal (speed deviation, command value) for use in identifying the angular transmission error of the proximal joint 7, and is a joint located on the distal side of the robot arm 4 with respect to the proximal joint 7. The distal joint 8 may be a joint for identifying an angular transmission error in the speed reducer angular transmission error identification system, and the proximal joint 7 may be a joint used for generating a signal (speed deviation, command value) for use in identifying the angular transmission error of the distal joint 8.

As shown in FIG. 2, each joint of the robot arm 4 includes a speed reducer including a drive unit that drives the joint and an output shaft connected to the corresponding joint (turning shaft), a servomotor which includes an output shall connected to the input shaft of the speed reducer and turns the corresponding joint via a speed reducer, and an encoder that detects the rotation angle of the output shaft of the servomotor. The rotation speed of the output shaft of the servomotor is calculated by time-differentiating the rotation angle of the encoder. Thus, the encoder detects information for detecting the rotation speed of the output shaft of the servomotor. The speed reducer is, for example, a strain wave gearing (Harmonic Drive (registered trademark)). However, it is not limited to this. Hereinafter, for convenience of explanation, a servomotor that drive the proximal joint 7, a speed reducer, and an encoder are referred to as a first motor 11, a first speed reducer 13, and a first encoder (first motor output shaft information detection unit) 12, respectively, and these constitute a proximal joint drive unit (first joint drive unit) 9. In addition, the servomotor, the speed reducer, and the encoder that drive the distal joint 8 are referred to as a second motor 16, a second speed reducer 18, and a second encoder (second motor output shaft information detection unit) 17, respectively, and these constitute a distal joint drive unit (second joint drive unit) 10.

The strain wave gearing according to the first speed reducer 13 and the second speed reducer 18 includes a circular spline, a flex spline, and a wave generator. The circular spline is a rigid internal gear, and is provided integrally with the housing, for example. The flex spline is a flexible external gear and meshes with the circular spline. The flex spline has fewer teeth than the circular spline and is connected to the output shaft 13b. The wave generator is an elliptical cam that is in contact with the inner side of the flex spline, and is connected to the input shaft 13a. Then, by rotating the input shaft, the wave generator moves the meshing position between the flex spline and the circular spline, and the flex spline rotates around the rotary axis according to the difference in the number of teeth between the circular spline and the flex spline, so that the output shaft rotates. The strain wave gearing has characteristics suitable for a speed reducer of a robot drive mechanism because of its features such as small size and light weight, high reduction ratio, high torque capacity, and non-backlash.

By the way, as shown in FIG. 11, in the speed reducer such as the strain wave gearing, there occurs an angular transmission error which is a difference between a theoretical output ration angle obtained by multiplying an input rotation angle input to the speed reducer by a reduction ratio and the actual output rotation angle due to a processing error or the like. This angular transmission error appears as a periodic change along with the rotation of the output shaft of the motor. Such an angular transmission error ATE of the speed reducer output shaft can be approximately expressed by a model using a function according to the following equation (1).

[Equation 1]

$$ATE = A \sin(f\theta + \phi) \quad (1)$$

Note that,

A is amplitude of angular transmission error model function f is frequency of angular transmission error model function (number of waves of angular transmission error per rotation of output shaft of motor)

θ is rotation angle of output shaft of servomotor (input shaft of speed reducer)

φ is phase of angular transmission error model function

As shown in FIG. 1, the hand 5 is configured to be able to perform a predetermined operation such as holding an article, and is attached to the distal end of the robot arm 4.

Configuration Example of Control Device

As shown in FIG. 2, the control device 2 includes a calculation unit 21, a storage unit 22, and a control unit that controls each joint. The control unit that controls each joint includes a proximal joint control unit (first joint control unit) 24 that controls the turning operation of the proximal joint 7 and a distal joint control unit (second joint control unit) 27 that controls the distal joint 8.

The proximal joint control unit 24 controls the operation of the first motor 11. The proximal joint control unit 24 includes a first command calculation unit 25 that generates a current command based on the target speed of an output shaft 11a of the first motor 11, and a fast anent control unit 26 that controls a current supplied to the first motor 11 based on the current command.

FIG. 3 is a block diagram schematically showing a configuration example of a control system of the first command calculation unit 25 and the second command calculation unit 28 of the robot system 100.

The first command calculation unit 25 includes a calculator such as a programmable logic device (HD) such as a microcontroller, CPU, ASIC, or FPGA. The calculator may be configured by a single calculator that performs centralized control, or may be configured by a plurality of calculators that perform distributed control in cooperation with each other. As shown in FIG. 3, the first command calculation unit 25 includes a position command generation unit 31, a speed command generation unit 33, an angular transmission error compensation with 34, a current command generation unit 36, and a gravity compensation unit 37. The position command generation unit 31, the speed command generation unit 33, the angular transmission error compensation unit 34, the current command generation unit 36, and the gravity compensation unit 37 are functional blocks that are realized when a calculation unit (not shown) executes a predetermined control program. In the present embodiment, the first command calculation unit 25 is configured by a calculator separate from the calculation unit 21, but may be integrated.

The position command generation unit 31 generates a position command based on the input target position. The position command is a control amount for controlling the position (rotation angle) of the output shalt 11a of the first motor 11. The angular transmission error compensation unit 34 calculates a control amount necessary to compensate the angular transmission error, adds this to a target position, for example, and corrects the value of the target position. The speed command generation unit 33 generates a speed command based on the position deviation between the position command and the rotation angle of the output shaft 11a of the first motor 11 detected by the first encoder 12. The speed command is a control amount for controlling the rotation speed of the output shaft 11a of the first motor 11. The current command generation unit 36 generates a current command based on the speed deviation between the value of the speed command and the rotation speed of the output shaft 11a of the first motor 11. The current command is a control amount for controlling the current supplied to the winding of the first motor 11. The first current control unit 26 controls the current supplied to the first motor 11 based on the current command generated by the first command calculation unit 25.

As shown in FIG. 2, the distal joint control unit 27 generates a command value based on the speed deviation between the target speed of an output shaft 16a of the second motor 16 and the rotation speed of the output shaft 16a of the second motor 16 so that the rotation speed of the second motor 16 maintains the target speed, and controls the operation of the second motor 16 based on this command value. The distal joint control unit 27 includes a second command calculation unit 28 that generates a current command based on the target speed of the output shalt 16a of the second motor 16, and a second current control unit 29 that controls a cu rent supplied to the second motor 16 based on the current command. The configurations of the second command calculation unit 28 and the second current control unit 29 are the same as those of the first command calculation unit 25 and the first current control unit 26, respectively, and thus detailed description thereof is omitted.

The calculation unit 21 is configured by a calculator such as a programmable logic device (PLD) such as a microcontroller, CPU, ASIC, or FPGA. The calculation unit may be configured by a single controller that performs centralized control, or may be configured by a plurality of controllers that perform distributed control in cooperation with each other. The calculation unit 21 includes a command unit 41, a variation data acquisition unit 42, a periodic function calculation unit 43, an average phase calculation unit 44, a phase identification unit 45, and an angular transmission error identification unit 46. The command unit 41, the variation data acquisition unit 42, the periodic function calculation unit 43, the average phase calculation unit 44, the phase identification unit 45, and the angular transmission error identification unit 46 are functional blocks that are realized when the calculation unit 21 executes a predetermined control program.

The command unit 41 generates a target position based on the operation program and outputs it. The output target position is input to a control unit that controls each joint. In the present embodiment, the target position is the rotation angle of the output shaft of the servomotor. When the output shaft of the motor is rotated at a constant rotation speed, the command unit 41 generates a target position corresponding to the rotation speed.

FIG. 4 is an explanatory diagram illustrating an example of the first to fourth regions of the turning range of the proximal joint 7 of the robot 1. FIG. 5 is a graph showing an example of first variation data 52.

The variation data acquisition unit 42 controls the robot 1 via the command unit 41 and acquires a plurality of variable data sets 51. The plurality of variable data sets are data sets respectively corresponding to predetermined regions that are different from each other in the turning range R of the proximal joint 7. In the present embodiment, the variation data acquisition unit 42 acquires four variable data sets 51 (first variable data set 51a, second variable data set 51b, third variable data set 5c, and fourth variable data set 51d). As shown in FIG. 4, the first variable data set 51a, the second variable data set 51b, the third variable data set 51c, and the fourth variable data set 51d are data sets respectively corresponding to a first region Ra, a second region Rb, a third region Rc, and a fourth region Rd of the proximal joint 7. Each variable data set 51 includes first variation data 52, second variation data 53, and a corresponding gravitational torque value 54 that are associated with each other. Note that the variable data set 51 may be a single data file or a plurality of data files that are associated with each other. In FIG. 2, first variation data 52, second variation data 53, and corresponding gravitational torque values 54 of the second to fourth variable data sets 51b, 51c, 51d are omitted.

As shown in FIG. 5, the first variation data 52 is data indicating the relationship between the rotation angle of the output shaft 11a of the first motor 11 and the speed deviation of the distal joint 8 (speed deviation between the target speed of the output shaft 16a of the second motor 16 and the rotation speed of the output shaft 16a of the second motor 16) or data indicating the relationship between the rotation angle of the output shall 11a of the first motor 11 and the command value (current command value or the like) generated based on the speed deviation of the distal joint 8 when the proximal joint control unit 24 controls the output shaft 11a of the first motor 11 so as to rotate in the first direction R1 (see FIG. 1) at a constant first target speed to turn the proximal joint 7 from the position of one end to the position of the other end in the corresponding region and simultaneously the distal joint control unit 27 rotate the output shaft of the second motor 16 at a constant second target speed. The speed deviation of the distal joint 8 is a speed deviation between the value of the speed command used when the current command generation unit 36 generates a current command and the rotation speed of the output shaft 16a of the second motor 16.

In the present embodiment, as shown in FIG. 4, the first variation data 52 of the first variable data set is data (see FIG. 5) which shows the relationship between the rotation angle of the output shaft 11a of the first motor 11 and the speed deviation of the distal joint 8 acquired when the proximal joint control unit 24 controls the proximal joint 7 so as to turn from the first position Pa1 to the second position Pa2 of the first region Ra. Further, the first variation data 52 of the second variable data set 51b is data indicating the relationship between the rotation angle of the output shaft 11a of the first motor 11 and the speed deviation of the distal joint 8 acquired when the proximal joint control unit 24 controls the proximal joint 7 so as to turn from the first position Pb1 to the second position Pb2 of the second region Rb. In addition, the first variation data 52 of the third variable data set 51c is data indicating the relationship between the rotation angle of the output shaft 11a of the first motor 11 and the speed deviation of the distal joint 8 acquired when the proximal joint control unit 24 controls the proximal joint 7 so as to turn from the first position Pc1 to the second position Pc2 of the third region Rc. Moreover, the first variation data 52 of the fourth variable data set 51d is data indicating the relationship between the rotation angle of the output shaft 11a of the first motor 11 and the speed deviation of the distal joint 8 acquired when the proximal joint control unit 24 controls the proximal joint 7 so as to turn from the first position Pd1 to the second position Pd2 of the fourth region Rd.

The second variation data 53 is data indicating the relationship between the rotation angle of the output shaft 11a of the first motor 11 and the speed deviation of the distal joint 8 (speed deviation between the target speed of the output shaft 16a of the second motor 16 and the rotation speed of the output shaft 16a of the second motor 16) or data indicating the relationship between the rotation angle of the output shaft 11a of the first motor 11 and the command value (current command value or the like) generated based on the speed deviation of the distal joint 8 when the proximal joint control unit 24 controls the output shaft 11a of the first motor 11 so as to rotate in the second direction R2 (see FIG. 1) which is a rotation direction opposite to the certain first direction R1 at a constant first target speed to turn the proximal joint 7 from the position of the other end to the position of one end in the corresponding region and simultaneously the distal joint control unit 27 rotates the output shaft 16a of the second motor 16 at a constant second target speed. That is, the second variation data 53 is data indicating the relationship between the rotation angle of the output shaft 11a of the first motor 11 and the speed deviation of the distal joint 8 or data indicating the relationship between the rotation angle of the output shaft 11a of the first motor 11 and the command value (current command value or the like) generated based on the speed deviation of the distal joint 8 when the proximal joint 7 is turned in a direction opposite to the turning direction of the proximal joint 7 of the proximal joint control unit 24 according to the first variation data 52. Further, the rotation speeds of the output shaft 11a of the first motor 11 and the output shaft 16a of the second motor 16 when the first variation data 52 is acquired are controlled to be the same.

In the present embodiment, as shown in FIG. 4, the second variation data 53 of the first variable data set is data indicating the relationship between the rotation angle of the output shaft 11a of the first motor 11 and the speed deviation of the distal joint 8 acquired when the proximal joint control unit 24 controls the proximal joint 7 so as to turn from the second position Pa2 to the first position Pa1 of the first region Ra. Further, the second variation data 53 of the second variable data set 51b is data indicating the relationship between the rotation angle of the output shaft 11a of the first motor 11 and the speed deviation of the distal joint 8 acquired when the proximal joint control unit 24 controls the proximal joint 7 so as to turn front the second position Pb2 to the first position Pb1 of the second region Rb. In addition, the second variation data 53 of the third variable data set 51c is data indicating the relationship between the rotation angle of the output shaft 11a of the first motor 11 and the speed deviation of the distal joint 8 acquired when the proximal joint control unit 24 controls the proximal joint 7 so as to turn from the second position Pc2 to the first position Pc1 of the third region Rc. Moreover, the second variation data 53 of the fourth variable data set 51d is data indicating the relationship between the rotation angle of the output shaft 11a of the first motor 11 and the speed deviation of the distal joint 8 acquired when the proximal joint control unit 24 controls the proximal joint 7 so as to turn from the second position Pd2 to the first position Pd1 of the fourth region Rd.

When acquiring the first variation data 52 and the second variation data 53, the variation data acquisition unit 42 turns the distal joint 8 so that the turning speed of the distal joint 8 is slower than the turning speed of the proximal joint 7. As a result, the influence of the turning of the distal joint 8 on the turning of the output shaft 11a of the first motor 11 can be suppressed, and the phase of the angular transmission error can be identified more accurately. More preferably, when acquiring the first variation data 52 and the second variation data 53, the variation data acquisition unit 42 slowly turns the distal joint 8 so that the distal joint 8 does not stop. As a result, it is possible to prevent a static frictional force from acting on the distal joint 8 and to appropriately acquire the first variation data 52 and the second variation data 53 while preventing an influence of the turning of the distal joint 8 on the turning of the output shaft 11a of the first motor 11.

Further, it is only necessary that the first variation data 52 and the second variation data 53 are data indicating the periodic variation of the operation of the distal joint 8 caused by the angular transmission error of the first motor 11. Therefore, the first variation data 52 and the second variation data 53 are not limited to data indicating the relationship between the rotation angle of the output shaft 11a of the first motor 11 and the speed deviation of the distal joint 8, or data indicating the relationship between the rotation angle of the output shaft 11a of the first motor 11 and the command value generated based on the speed deviation of the distal joint 8.

Incidentally, even if the output shaft 11a of the first motor 11 is rotated at a constant rotation speed, the output shaft 13b of the first speed reducer 13 does not rotate at a constant rotation speed due to the angular transmission error of the first speed reducer 13. An undulation occurs in the rotation speed of the output shaft 13b, the robot arm 4 vibrates, and the distal joint 8 vibrates. As a result, even if the distal joint control unit 27 generates a command value so that the rotation speed of the second motor 16 maintains the constant target speed, and controls the operation of the second motor 16 based on this command value, the actual rotation speed of the output shaft 16a of the send motor 16 of the distal joint 8 periodically changes based on the moment of inertia acting on the distal joint 8. The speed deviation between the actual rotation speed of the output shaft 16a of the second motor 16 that periodically changes and the target speed that takes a constant value also periodically changes. Further, at this time, in order that the distal joint control unit 27 that turns the distal joint 8 turns the output shaft 16a of the second motor 16 at a constant turning speed, the current command generation unit 36 of the distal joint control unit 27 changes the can ent command value so that the speed deviation approaches 0 to adjust the current supplied to the second motor 16 by feedback control. As described above, due to the angular transmission error of the first speed reducer 13 that periodically varies, the speed deviation and the current command value of the second command calculation unit 28 periodically change. That is, the speed deviation or current command value of the first variation data 52 and the second variation data 53 varies periodically, and the frequency thereof takes the same as the frequency of the angular transmission error of the first speed reducer 13.

As shown in FIG. 2, the corresponding gravitational torque value 54 is a value (G1 to G4) of the gravitational torque acting on the output shaft 13b of the first speed reducer 13 in the region (Ra, Rb, Rc, Rd in FIG. 4) corresponding to each variable data set 51. These gravitational torques (G1 to G4) are values calculated by, for example, the gravity compensation unit 37 of the first command calculation unit 25, and, are, for example, the average value of the gravitational torque that acts on the output shaft 13b of the first speed reducer 13 in the corresponding region.

For each of the plurality of variable data sets 51, the periodic function calculation unit 43 calculates a first periodic function F1 that models the first variation data 52 and a second periodic function F2 that models the second variation data 53. In the present embodiment, the periodic function calculation unit 43 is approximately expressed by a model using the function according to Equation (1), and, as shown in FIG. 5, calculates the first periodic function F1 as an amplitude A1, a frequency f1 and a phase φ1 as a sin function having as a parameter. Further, the periodic function calculation unit 43 calculates the second periodic function F2 as a sin function having an amplitude A2, a frequency f2, and a phase φ2 as a parameter. The frequencies f1 and f2 are values inherent to the speed reducer, and it is known that the frequency is 2 in the first speed reducer 13 which is a wave gear speed reducer.

FIG. 6 is a graph showing the first periodic function F1 and the second periodic function F2 calculated by the periodic function calculation unit 43.

As shown in FIG. 6, the average phase calculation unit 44 calculates an average phase φa which is an average value of the phase φ1 of the first periodic function F1 and the phase φ2 of the second periodic function F2 for each of the plurality of variable data sets. The function Fa shown in FIG. 6 represents a function having the same amplitude and frequency as F1 and F2 and having a phase φa. Hereinafter, the aver rage phases of the first to fourth variable data sets 51a, 51b, 51c, and 51d are referred to as φa1, φa2, φa3, and φa4, respectively.

Note that due to the control delay of the distal joint control unit 27, there is a time lag until the change in the rotation speed of the output shaft 11a of the first motor 11 due to an angular transmission error appears as a change in the speed deviation or command value of the second command calculation unit 28, and therefore the phase of the angular transmission error and the phase φ1 of the first periodic function F1, and the phase of the angular transmission error and the phase φ2 of the second periodic function F2 do not match. However, since the phase difference between the angular transmission error and the first periodic function F1 and the phase difference between the angular transmission error and the second periodic function F2 can be considered equal, an average phase φa which is an average value of the phase φ1 of the first periodic function F1 and the phase φ2 of the second periodic function F2 is calculated, and this is regarded as the phase of the angular transmission error of the corresponding variable data set.

FIG. 7 is a graph showing an example of the phase relationship between the phase of the angular transmission error and the phase of the gravitational torque.

The phase identification unit 45 calculates a correlation between the value of the gravitational torque acting on the output shaft 13b of the first speed reducer 13 and the average phase based on the average phases φa1 to φa4 of the plurality of variable data sets and the values of the corresponding gravitational torques G1 to G4 corresponding to the average phases φa1 to φa4.

In the present embodiment, as shown in FIG. 7, the phase identification unit 45 calculates a linear function F3 according to the following equation (2) that models the correlation between the value of the gravitational torque acting on the output shaft 13b of the first speed reducer 13 and the average phase φa, and this is regarded (identified) as the phase of the angular transmission error.

[Equation 2]

$$\phi = aG + \phi 0 \quad (2)$$

Note that,

φ is phase of angular transmission error model function
a is gravitational torque-phase proportionality constant
G is gravitational torque
φ0 is phase of angular transmission error model function when gravitational torque is 0

The phase identification unit 45 calculates the coefficients φ0 and a in the above equation (1) using the least square method.

It has been found that the phase of the angular transmission error changes according to the torque acting on the output shaft of the speed reducer. In the present embodiment, the phase identification unit 45 approximately represents the change in the phase of the angular transmission emir by a model expressed as a linear function of the torque acting on the output shaft of the speed reducer, and with this, the angular transmission error can be compensated more accurately.

The angular transmission error identification unit 46 calculates the periodic variation of the angular transmission error of the first speed reducer 13 based on the correlation between the value of the gravitational torque acting on the output shaft 13b of the first speed reducer 13 calculated by the phase identification unit 45 and the average phase φa. That is, the angular transmission am identification unit 46 calculates the phase φ of the angular transmission error based on the function calculated by the phase identification unit 45. Then, using the calculated phase φ, the predetermined frequency f, and the amplitude A, the periodic function according to the above equation (1) that models the periodic variation of the angular transmission error of the first speed reducer 13 is calculated.

In addition, when the predetermined frequency f takes a specific value according to the structure of the first speed reducer 13, the frequency f may be the specific value. For example, when the first speed reducer 13 is a strain wave gearing, the value of the frequency f is 2 as described above.

As shown in FIG. 2, the storage unit 22 includes a memory such as a ROM and a RAM. A predetermined program is stored in the storage unit 22, and the calculation unit 21 reads and executes these programs so that various processes are performed. The storage unit 22 stores the plurality of variable data sets 51.

Operation Example

Next, an operation example of the robot system 100 will be described

<Identification Processing Operation of Angular Transmission Error>

FIG. 8 and FIG. 9 are flowcharts showing an operation example of the robot system 100.

An identification processing operation of the angular transmission error will be described below.

First, as shown in FIG. 8, the variation data acquisition unit 42 acquires the first variable dam set 51a (Step S1).

In the acquisition processing operation of the first variable data set 51a, as shown in FIG. 9, the variation data acquisition unit 42 positions the proximal joint 7 at a predetermined position (on the second direction R2 side of the first region Ra) and positions the distal joint 8 in such a posture that the distal joint 8 and the proximal joint 7 interfere with each other (Step S11). The posture in which the distal joint 8 and the proximal joint 7 interfere with each other means a posture having a large mutual inertia coefficient of the inertia matrix of the dynamic equation according to fire equation (3).

[Equation 3]

$$T = I\ddot{\Phi} + H + G \quad (3)$$

Note that, $T$ is vector torque $\begin{bmatrix} \tau_1 \\ \tau_2 \end{bmatrix}$ applied to proximal joint and distal joint $I$ is inertia matrix $\begin{bmatrix} I_{11} & I_{12} \\ I_{21} & I_{22} \end{bmatrix}$ and $I_{12}$ and $I_{21}$ are mutual inertia coefficient $\ddot{\Phi}$ is acceleration vector $\begin{bmatrix} \ddot{\Phi}_1 \\ \ddot{\Phi}_2 \end{bmatrix}$ of proximal joint and distal joint $H$ is Coriolis effect and centrifugal force $G$ is gravity vector Next, the variation data acquisition unit 42 controls so that the proximal joint control unit 24 rotates the output shaft 11a of the first motor 11 in the first direction A1 at the constant first target speed to turn the proximal joint 7 torn the position of one end to the position of the other end in the corresponding region (Step S12). At the same time, the distal joint control unit 27 rotates the output shaft of the second motor 16 at the constant second target speed (Step S13). Then, data indicating the relationship between the rotation angle of the output shaft 11a of the first motor 11 and the speed deviation of the distal joint 8 during the operation is acquired (Step S14).

Next, the variation data acquisition unit 42 controls so that the proximal joint control unit 24 rotates the output shaft 11a of the first motor 11 in the second direction R2 which is a rotation direction opposite to the certain first direction R1 at the constant first target speed to turn the proximal joint 7 from the position of the other end to the position of one end in the corresponding region (Step S15). At the same time, the distal joint control unit 27 rotates the output shaft 16a of the second motor 16 at the constant second target speed (Step S16). Then, data indicating the relationship between the rotation angle of the output shaft 11a of the first motor 11 and the speed deviation during the operation is acquired (Step S17).

Next, the variation data acquisition unit 42 associates the first variation data 52, the second variation data 53 and the value G1 of the gravitational torque acting on the output shaft 13b of the first speed reducer 13 in the first region Ra with each other; and causes the storage unit 22 to store it (Step S18). This stored data constitutes the first variable data set. In this way, the variation data acquisition unit 42 performs the acquisition processing operation of the first variable data set 51a.

Then, as shown in FIG. 8, similarly to the above steps S11 to S14 according to the acquisition processing operation of the lint variable data set, the variation data acquisition unit 42 performs the acquisition processing operation of the second variable data set 51b to the fourth variable data set 51d (Steps S2 to S4).

In this operation example, the first variable data set 51a to the fourth variable data set 51d are acquired in order, instead of this, each variable data set may be acquired in such a manner that the first variation data 52 in the first region Ra to the fourth region Rd is acquired from the data acquired by rotating the proximal joint drive unit 9 in the first direction R1, the second variation data 53 in the first region Ra to the fourth region Rd is acquired from the data acquired by rotating the proximal joint drive unit 9 in the second direction R2, and the first variation data 52, the second variation data 53 in each region and the value of the gravitational torque acting on the output shaft 13b of the first speed reducer 13 are associated with each other.

For each of the first to fourth variable data sets 51a, 51b, 51c, and 51d, the periodic function calculation unit 43 calculates the first periodic function F1 that models the first variation data 52 and the second periodic function F2 that models the second variation data 53 (Step S5).

Next, the average phase calculation unit 44 calculates the average phase φa which is an average value of the phase φ1 of the first periodic function F1 and the phase φ2 of the second periodic function F2 for each of the first to fourth variable data sets 51a, 51b, 51c, and 51d (Step S6).

Next, the phase identification unit 45 calculates the coefficients φ0 and a in the above equation (2) using the least square method based on the average phase φa according to the first to fourth variable data sets 51a, 51b, 51c, 51d and calculates a linear function that models the correlation between the value of the gravitational torque acting on the output shaft 13b of the first speed reducer 13 and the average phase φa (Step S7).

Next, the angular transmission error identification unit 46 calculates the phase φ of the angular transmission error based on the function calculated by the phase identification unit 45. Then, using the calculated phase φ, the predetermined frequency f, and the amplitude A, the periodic function that models the periodic variation of the angular transmission error of the first speed reducer 13 is calculated (Step S8). Then, the angular transmission error compensation unit 34 compensates the angular transmission error using the periodic function calculated by the angular transmission error identification unit 46.

Thus, in the present embodiment, the robot system 100 can identify the angular transmission error.

As described above, since the robot system 100 is configured to identify the phase of the angular transmission error of the proximal joint 7 based on the value of the current command of the distal joint 8, the phase of the angular transmission error can be identified accurately. As a result, the angular transmission error can be compensated accurately; and the vibration of the robot hand can be suppressed. In addition, the phase of the angular transmission error can be quickly identified.

Furthermore, since the robot system 100 is configured to identify the phase of the angular transmission error based on the speed deviation or the command value used to control the operation of the robot 1, there is no need to separately provide measuring unit for identifying the phase. As described above, the configuration of the robot system 100 including the speed reducer angular transmission error identification system can be simplified. This is advantageous for manufacture and manufacturing cost is reduced.

Second Embodiment in the first embodiment described above, the angular transmission error identification unit 46 calculates a periodic function that models the periodic variation of the angular transmission error of the first s reducer 13 using the predetermined amplitude A.

In the present embodiment, the robot 1 is operated by compensating the angular transmission error using the periodic function in which the phase φ determined by the function calculated by the phase identification unit 45, the predetermined frequency f and an arbitrary amplitude value are set, and an optimum amplitude value is determined by trial and error.

Third Embodiment

Hereinafter, the configuration and operation of the third embodiment will lie described focusing on the differences from the first embodiment.

In the present embodiment, the average phase calculation unit 44 calculates the following first temporary average phase φax and second temporary average phase φay for each variable data set 51.

$$\varphi ax=(\varphi 1+\varphi 2)/2$$

$$\varphi ay=(\varphi 1+\varphi 2+2\pi)/2$$

In addition, the variation data acquisition unit 342 controls the robot 1 via the command unit 41, operates the robot 1, and first acquires the third variation data and the fourth variation data. The third variation data is data indicating the relationship between the rotation angle of the output shaft 11a of the first motor 11 and the speed deviation of the distal joint 8 or data indicating the relationship between the rotation angle of the output shaft 11a of the first motor 11 and the command value generated based on the speed deviation of the distal joint 8 when the angular transmission error is compensated using the periodic function in which the phase φax, the predetermined frequency f, and the predetermined amplitude A are set, and the robot 1 is operated in the corresponding region. The fourth variation data is data indicating the relationship between the rotation angle of the output shaft 11a of the first motor 11 and the speed deviation or data indicating the relationship between the rotation angle of the output shaft 11a of the first motor 11 and the command value generated based on the speed deviation when the angular transmission error is compensated using the periodic function in which the phase φay, the predetermined frequency f, and the predetermined amplitude A are set, and the robot 1 is operated in the first region Ra.

The periodic function calculation unit 343 calculates the amplitude A of the periodic function that models each of the third variation data and the fourth variation data.

The phase identification unit 345 determines that the phase corresponding to the periodic function having a small amplitude A among the first temporary average phase φax and the second temporary average phase φay is the average phase φa.

Operation Example

FIG. 10 is a flowchart showing an operation example of a robot system 300.

In Step S6 of the first embodiment described above, the average phase calculation unit 44 first calculates the first temporary average phase φax and the second temporary average phase φay for the first variable data set 51a (Step S301).

Next, the variation data acquisition unit 342 controls the robot 1 via the command unit 41, operates the robot 1, and acquires the third variation data and the fourth variation data (Step S302, step S303).

Next, the periodic function calculation unit 343 calculates the amplitude A of the periodic function that models each of the third variation data and the fourth variation data (Step S304).

Next, the phase identification unit 345 determines that the phase corresponding to the periodic function having a small amplitude A among the first temporary average phase φax and the second temporary average phase φay is the average phase φa, and this is regarded as the average phase φa (Step S305).

The remaining second variable data set 51b, third variable data set 51c, and fourth variable data set 51d are similarly subjected to the processing operations according to Steps S301 to S305 above.

Thus, in the present embodiment, the robot system 300 can identify the phase of the angular transmission error even when the angular transmission error has a phase difference of 2π or more.

Based on the foregoing description, it is apparent for a person skilled in the art that many modifications and other embodiments may be made to the present invention. Therefore, the foregoing description should be interpreted only as an example and is provided for the purpose of teaching the best mode for carrying out the present invention to a person skilled in the art. The structures and/or functional details may be substantially modified without departing from the spirit of the present invention.

REFERENCE SIGNS LIST

1 robot
2 control device
4 robot arm
7 proximal joint
8 distal joint
11 first motor
11a output shaft
12 first encoder
13 first speed reducer
13a input shaft
13b output shaft
16 second motor
16a output shaft
17 second encoder
18 second speed reducer
21 calculation unit
22 storage unit
23 servo control unit
24 proximal joint control unit
27 distal joint control unit
42 variation data acquisition unit
43 periodic function calculation unit
44 average phase calculation unit
45 phase identification unit
46 angular transmission error identification unit
51 variable data set
52 first variation data
53 second variation data
54 corresponding gravitational torque value
100 robot system

The invention claimed is:

1. A speed reducer angular transmission error identification system comprising:
a robot arm including a plurality of joints including a first joint and a second joint;
a first joint drive unit including a first speed reducer including an output shaft connected to the first joint, and a first motor which includes an output shaft connected to an input shaft of the first speed reducer and turns the first joint via the first speed reducer;
a first joint control unit that controls an operation of the first motor;
a second joint drive unit including a second motor which includes an output shaft connected to the second joint and turns the second joint;
a second joint control unit that controls an operation of the second motor;
a variation data acquisition unit that acquires first variation data and second variation data associated with each other, the first variation data being data indicating a periodic variation of an operation of the second joint caused by an angular transmission error of the first motor when the first joint control unit controls so as to rotate the output shaft of the first motor in a first direction at a constant first target speed and to turn the first joint from a position of one end to a position of the other end in a predetermined region in a turning range of the first joint and simultaneously the second joint drive unit rotates the output shaft of the second motor at the constant second target speed, the second variation data being data indicating a periodic variation of an operation of the second joint caused by an angular transmission error of the first motor when the first joint control unit controls so as to rotate the output shaft of the first motor in a second direction which is a rotation direction opposite to the first direction at the constant first target speed and to turn the first joint from the position of the other end to the position of the one end in the region and simultaneously the second joint drive unit rotates the output shaft of the second motor at the constant second target speed;

a periodic function calculation unit that calculates a first periodic function that models the first variation data and a second periodic function that models the second variation data;
a phase calculation unit that calculates an average phase which is an average value of a phase of the first periodic function and a phase of the second periodic function; and
an angular transmission error identification unit that calculates a periodic variation of an angular transmission error of the first speed reducer based on the average phase.

2. The speed reducer angular transmission error identification system according to claim 1,
wherein the second joint drive unit further includes a second motor output shaft information detection unit that detects information for detecting a rotation speed of the output shaft of the second motor,
wherein the second joint control unit generates a command value based on a speed deviation between a target speed of the output shaft of the second motor and a rotation speed of the output shaft of the second motor so that the rotation speed of the second motor maintains the target speed, and controls the operation of the second motor based on this command value, and
wherein the data indicating the periodic variation of the operation of the second joint caused by the angular transmission error of the first motor is data indicating a relationship between a rotation angle of the output shaft of the first motor and the speed deviation or the command value of the second motor.

3. The speed reducer angular transmission error identification system according to claim 1, wherein the angular transmission error identification unit calculates a periodic function that models a periodic variation of the angular transmission error of the first speed reducer, and sets a phase of the periodic function based on the average phase calculated by the phase calculation unit.

4. The speed reducer angular transmission error identification system according to claim 1, wherein the first speed reducer is a strain wave gearing device.

5. The speed reducer angular transmission error identification system according to claim 1, wherein a turning speed of the output shaft of the second motor is slower than a turning speed of the output shaft of the first motor when the first variation data and the second variation data are acquired.

6. A speed reducer angular transmission error identification system comprising:
a robot arm including a plurality of joints including a first joint and a second joint;
a first joint drive unit including a first speed reducer including an output shaft connected to the first joint, and a first motor which includes an output shaft connected to an input shaft of the first speed reducer and turns the first joint via the first speed reducer;
a first joint control unit that controls an operation of the first motor;
a second joint drive unit including a second motor which includes an output shaft connected to the second joint and turns the second joint;
a second joint control unit that controls an operation of the second motor;
a variation data acquisition unit that acquires a plurality of variable data sets each including first variation data, second variation data, and a corresponding gravitational torque value in which the first variation data, the second variation data, and the corresponding gravitational torque value are associated with each other, the plurality of variable data sets being data sets corresponding to different predetermined regions of a turning range of the first joint, the first variation data being data indicating a periodic variation of an operation of the second joint caused by an angular transmission error of the first motor when the first joint control unit controls so as to rotate the output shaft of the first motor in a first direction at a constant first target speed and to turn the first joint from a position of one end to a position of the other end in the corresponding region and simultaneously the second joint drive unit rotates the output shaft of the second motor at the constant second target speed, the second variation data being data indicating a periodic variation of an operation of the second joint caused by an angular transmission error of the first motor when the first joint control unit controls so as to rotate the output shaft of the first motor in a second direction which is a rotation direction opposite to the first direction at the constant first target speed and to turn the first joint from the position of the other end to the position of the one end in the corresponding region and simultaneously the second joint drive unit rotates the output shaft of the second motor at the constant second target speed, the corresponding gravitational torque value being a value of gravitational torque acting on the output shaft of the first speed reducer in the corresponding region;
a periodic function calculation unit that calculates a first periodic function that models the first variation data and a second periodic function that models the second variation data for each of the plurality of variable data sets;
a phase calculation unit that calculates an average phase which is an average value of a phase of the first periodic function and a phase of the second periodic function for each of the plurality of variable data sets;
a phase identification unit that calculates a correlation between the gravitational torque value acting on the output shaft of the first speed reducer and the average phase based on the average phase of each of the plurality of variable data sets and the corresponding gravitational torque value corresponding to the each average phase; and
an angular transmission error identification unit that calculates a periodic variation of an angular transmission error of the first speed reducer based on the correlation between the gravitational torque value acting on the output shaft of the first speed reducer and the average phase, which is calculated by the phase identification unit.

7. The speed reducer angular transmission error identification system according to claim 6,
wherein the second joint drive unit further includes a second motor output shaft information detection unit that detects information for detecting a rotation speed of the output shaft of the second motor,
wherein the second joint control unit generates a command value based on a speed deviation between a target speed of the output shaft of the second motor and a rotation speed of the output shaft of the second motor so that the rotation speed of the second motor maintains the target speed, and controls the operation of the second motor based on this command value, and
wherein the data indicating the periodic change variation of the operation of the second joint caused by the angular transmission error of the first motor is data indicating a relationship between a rotation angle of the output shaft of the first motor and the speed deviation or the command value of the second motor.

8. The speed reducer angular transmission error identification system according to claim 6,
wherein the phase identification unit calculates a function that models the correlation between the gravitational torque value acting on the output shaft of the first speed reducer and the average phase, and
wherein the angular transmission error identification unit calculates a periodic function that models the periodic variation of the angular transmission error of the first speed reducer, and regards a phase of the periodic function as a function calculated by the phase identification unit.

9. The speed reducer angular transmission error identification system according to claim 8, wherein the phase identification unit calculates the correlation between the gravitational torque value acting on the output shaft of the first speed reducer and the average phase as a linear function using a least square method.

10. The speed reducer angular transmission error identification system according to claim 6, wherein the first speed reducer is a strain wave gearing device.

11. The speed reducer angular transmission error identification system according to claim 6, wherein a turning speed of the output shaft of the second motor is slower than a turning speed of the output shaft of the first motor when the first variation data and the second variation data are acquired.

12. A speed reducer angular transmission error identification method for a robot system,
the robot system including:
a robot arm including a plurality of joints including a first joint and a second joint;
a first joint drive unit including a first speed reducer including an output shaft connected to the first joint, and a first motor which includes an output shaft connected to an input shaft of the first speed reducer and turns the first joint via the first speed reducer;
a first joint control unit that controls an operation of the first motor;
a second joint drive unit including a second motor which includes an output shaft connected to the second joint and turns the second joint;
a second joint control unit that controls an operation of the second motor;
the speed reducer angular transmission error identification method comprising:
a variation data acquisition step of acquiring first variation data and second variation data associated with each other, the first variation data being data indicating a periodic variation of an operation of the second joint caused by an angular transmission error of the first motor when the first joint control unit controls so as to rotate the output shaft of the first motor in a first direction at a constant first target speed and to turn the first joint from a position of one end to a position of the other end in a predetermined region in a turning range of the first joint and simultaneously the second joint drive unit rotates the output shaft of the second motor at the constant second target speed, the second variation data being data indicating a periodic variation of an operation of the second joint caused by an angular transmission error of the first motor when the first joint control unit controls so as to rotate the output shaft of the first motor in a second direction which is a rotation direction opposite to the first direction at the constant first target speed and to turn the first joint from the position of the other end to the position of the one end in the region and simultaneously the second joint drive unit rotates the output shaft of the second motor at the constant second target speed;
a periodic function calculation step of calculating a first periodic function that models the first variation data and a second periodic function that models the second variation data;
a phase calculation step of calculating an average phase which is an average value of a phase of the first periodic function and a phase of the second periodic function; and
an angular transmission error identification step of calculating a periodic variation of an angular transmission error of the first speed reducer based on the average phase.

13. A speed reducer angular transmission error identification method for a robot system,
the robot system including:
a robot arm including a plurality of joints including a first joint and a second joint;
a first joint drive unit including a first speed reducer including an output shaft connected to the first joint, and a first motor which includes an output shaft connected to an input shaft of the first speed reducer and turns the first joint via the first speed reducer;
a first joint control unit that controls an operation of the first motor;
a second joint drive unit including a second motor which includes an output shaft connected to the second joint and turns the second joint;
a second joint control unit that controls an operation of the second motor;
the speed reducer angular transmission error identification method comprising:
a variation data acquisition step of acquiring a plurality of variable data sets each including first variation data, second variation data, and a corresponding gravitational torque value in which the first variation data, the second variation data, and the corresponding gravitational torque value are associated with each other, the plurality of variable data sets being data sets corresponding to different predetermined regions of a turning range of the first joint, the first variation data being data indicating a periodic variation of an operation of the second joint caused by an angular transmission error of the first motor when the first joint control unit controls so as to rotate the output shaft of the first motor in a first direction at a constant first target speed and to turn the first joint from a position of one end to a position of the other end in the corresponding region and simultaneously the second joint drive unit rotates the output shaft of the second motor at the constant second target speed, the second variation data being data indicating a periodic variation of an operation of the second joint caused by an angular transmission error of the first motor when the first joint control unit controls so as to rotate the output shaft of the first motor in a second direction which is a rotation direction opposite to the first direction at the constant first target speed and to turn the first joint from the position of the other end to the position of the one end in the corresponding region and simultaneously the second joint drive unit rotates the output shaft of the second motor at the constant second target speed, the corresponding gravitational torque value being a value of gravitational torque acting on the output shaft of the first speed reducer in the corresponding region;
a periodic function calculation step of calculating a first periodic function that models the first variation data and a second periodic function that models the second variation data for each of the plurality of variable data sets;
a phase calculation step of calculating an average phase which is an average value of a phase of the first periodic function and a phase of the second periodic function for each of the plurality of variable data sets;
a phase identification step of calculating a correlation between the gravitational torque value acting on the output shaft of the first speed reducer and the average phase based on the average phase of each of the plurality of variable data sets and the corresponding gravitational torque value corresponding to the each average phase; and
an angular transmission error identification step of calculating a periodic variation of an angular transmission error of the first speed reducer based on the correlation between the gravitational torque value acting on the output shaft of the first speed reducer and the average phase, which is calculated by the phase identification unit.

* * * * *